(12) United States Patent
Yaphe et al.

(10) Patent No.: US 11,181,262 B2
(45) Date of Patent: Nov. 23, 2021

(54) LUMINAIRE STRUCTURE

(71) Applicant: AXIS LIGHTING INC., Lasalle (CA)

(72) Inventors: Howard Yaphe, Lasalle (CA); Andrew Miles, Lasalle (CA); Steven Lavictoire, Lasalle (CA); Thomas James, Lasalle (CA)

(73) Assignee: Axis Lighting Inc., LaSalle (CA)

( * ) Notice: Subject to any disclaimer, the term of this patent is extended or adjusted under 35 U.S.C. 154(b) by 0 days.

(21) Appl. No.: 17/067,369

(22) Filed: Oct. 9, 2020

(65) Prior Publication Data
US 2021/0293405 A1 Sep. 23, 2021

Related U.S. Application Data

(60) Provisional application No. 62/991,535, filed on Mar. 18, 2020.

(51) Int. Cl.
*F21V 31/00* (2006.01)
*F21S 8/04* (2006.01)
(Continued)

(52) U.S. Cl.
CPC ............ *F21V 31/005* (2013.01); *F21S 8/043* (2013.01); *F21S 2/005* (2013.01); *F21S 4/20* (2016.01);
(Continued)

(58) Field of Classification Search
CPC ........ F21V 31/00; F21V 31/005; F21V 31/03; F21V 2200/10; F21V 2200/13;
(Continued)

(56) References Cited

U.S. PATENT DOCUMENTS

| 5,934,786 A * | 8/1999 | O'Keefe | F21V 31/00 362/147 |
| 8,240,875 B2 * | 8/2012 | Roberts | F21V 5/002 362/217.05 |

(Continued)

FOREIGN PATENT DOCUMENTS

| DE | 202018101487 U1 * | 4/2018 | ............. F21V 29/15 |
| KR | 102126517 B1 * | 6/2020 | |

*Primary Examiner* — Alexander K Garlen
*Assistant Examiner* — Colin J Cattanach
(74) *Attorney, Agent, or Firm* — Barnes & Thornburg LLP

(57) ABSTRACT

Disclosed is a luminaire including a ceiling mountable housing that defines an inner cartridge-receiving cavity accessible at an opening that is accessible in a healthcare space. A cartridge is provided to be received in the housing. The housing and the cartridge are configured to establish a first NSF-compliant sealing interface formed by at least one first barrier member extending along a first peripheral region between the housing and the cartridge to establish a first NSF-compliant pathogen barrier. The cartridge includes a light output region that is configured to locate an interior light guide and an exterior lens with an optical spacing therebetween. A second NSF-compliant sealing barrier interface is provided between the lens and the light guide formed by at least one second barrier member extending along a second peripheral region between the lens and light guide, and which is configured to establish a second NSF-compliant pathogen barrier therein.

20 Claims, 9 Drawing Sheets

(51) Int. Cl.
*F21S 4/20* (2016.01)
*F21S 4/28* (2016.01)
*F21S 2/00* (2016.01)
*F21V 19/00* (2006.01)
*F21V 17/06* (2006.01)
*F21V 17/16* (2006.01)

(52) U.S. Cl.
CPC .............. *F21S 4/28* (2016.01); *F21V 17/06* (2013.01); *F21V 17/16* (2013.01); *F21V 19/003* (2013.01); *F21V 19/004* (2013.01); *F21V 2200/00* (2015.01); *F21V 2200/20* (2015.01)

(58) Field of Classification Search
CPC ............ F21V 2200/15; F21V 2200/17; F21V 2200/20; F21V 2200/30; F21V 2200/40; F21V 15/013; F21V 5/008; A61L 2209/12; F21S 4/28
See application file for complete search history.

(56) References Cited

U.S. PATENT DOCUMENTS

| | | | |
|---|---|---|---|
| 8,282,259 | B2 | 10/2012 | Itaya |
| 9,534,771 | B2 | 1/2017 | Wu et al. |
| 10,443,827 | B2 * | 10/2019 | Lax ................. F21V 23/001 |
| 10,585,229 | B1 * | 3/2020 | Lax ..................... F21S 4/28 |
| 10,794,580 | B1 * | 10/2020 | Su .................... F21V 31/005 |
| 2015/0219825 | A1 | 8/2015 | Wu |
| 2015/0267910 | A1 * | 9/2015 | Lazalier ................ F21K 9/60 362/267 |
| 2015/0362155 | A1 * | 12/2015 | Thomsen ........... F21V 23/0464 362/268 |
| 2019/0162392 | A1 * | 5/2019 | Guerra .................. F21V 17/164 |
| 2019/0170341 | A1 * | 6/2019 | Lax ........................ F21V 3/04 |
| 2019/0285265 | A1 * | 9/2019 | Lee ...................... F21V 17/002 |
| 2020/0284420 | A1 * | 9/2020 | Cordero ................. F21V 15/01 |
| 2020/0386396 | A1 * | 12/2020 | Wolfe .................. F21V 15/013 |

* cited by examiner

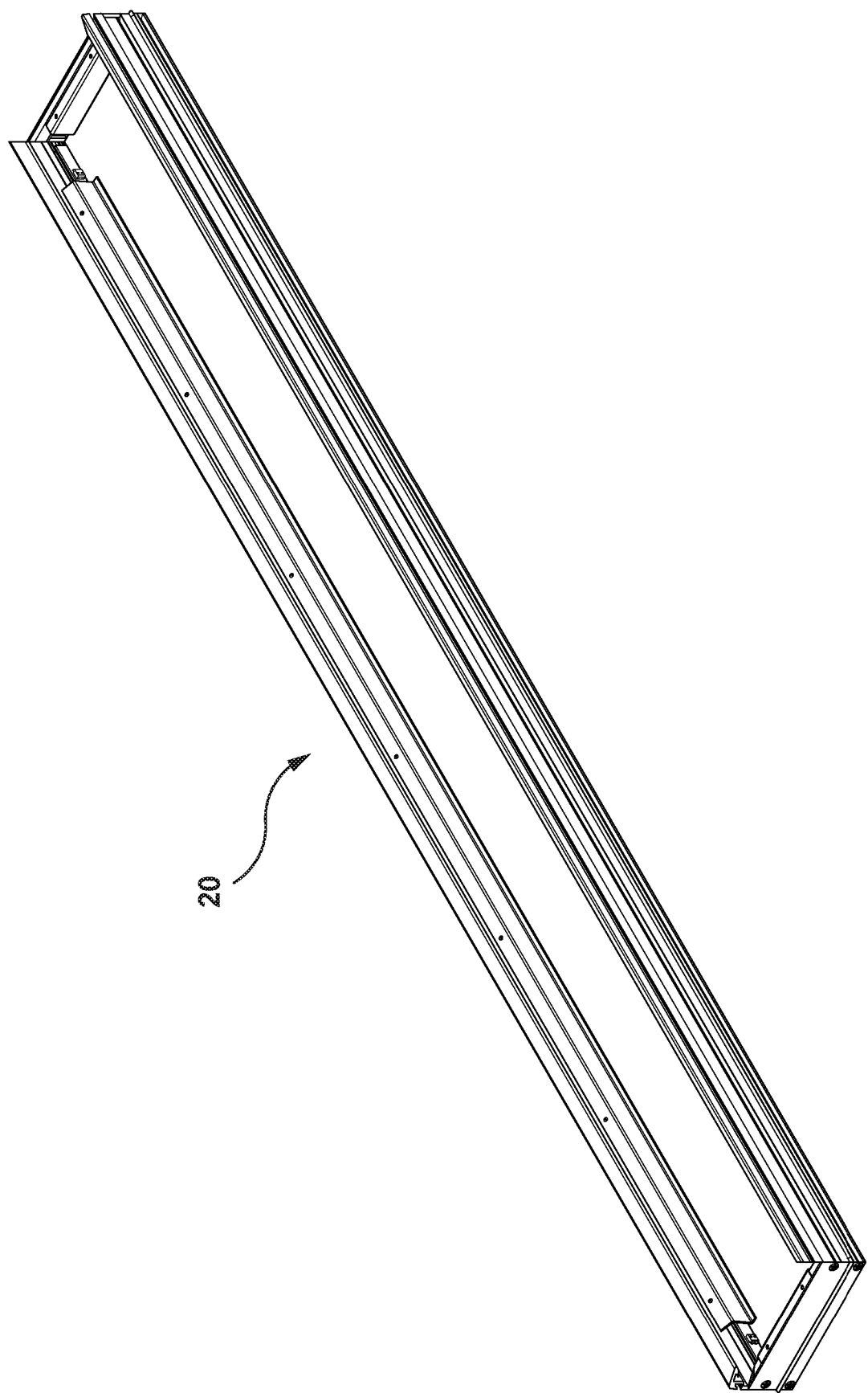

LUMINAIRE STRUCTURE

CROSS REFERENCE TO CO-PENDING APPLICATIONS

This application claims the benefit of priority under 35 U.S.C. § 119(e) to U.S. Provisional Patent Application No. 62/991,535, filed Mar. 18, 2020. The disclosure set forth in the referenced application is incorporated herein by reference in its entirety.

The disclosure set forth in U.S. patent application Ser. No. 16/899,047, filed Jun. 11, 2020, entitled LUMINAIRE STRUCTURE is incorporated herein by reference in its entirety.

FIELD OF THE DISCLOSURE

The present disclosure relates to luminaire structures and associated structures.

BACKGROUND

In large part, National Science Foundation (NSF) standards set the requirements for luminaire structures for healthcare applications and others. These standards have traditionally limited the kinds of design esthetics that can be deployed in healthcare applications. Traditional luminaire structures in these environments tend to have limited versatility, if any, to provide configurable lighting solutions, to illuminate spaces for different functions. For instance, an emerging trend is to use the same healthcare space, such as a patient bedroom, for an increasing number of activities, including for example, for pre- and post-operative examinations. Current luminaire structures are in some cases unable to deliver photometrics matched to the right location, at an effective level of brightness, color and/or luminosity, to suit each activity.

It would thus be desirable to provide novel approaches for luminaire structures capable of being used in such healthcare environments, or at least to provide the public with one or more useful alternatives.

SUMMARY

In an aspect, there is provided a luminaire including a ceiling mountable housing that defines an inner cartridge-receiving cavity accessible at an opening that is accessible in a healthcare space. A cartridge is provided to be received in the in the housing with a seal between the cartridge and the housing. The housing and the cartridge are configured to establish a first NSF-compliant sealing barrier interface formed by at least one first barrier member extending along a first peripheral region between the housing and the cartridge to establish a first NSF-compliant pathogen barrier therein. The cartridge includes a light output region that is configured to locate an interior light guide and an exterior lens at a designated optical spacing therebetween, and a second NSF-compliant sealing barrier interface between the lens and the light guide formed by at least one second barrier member extending along a second peripheral region between the lens and light guide, and which is configured to establish a second NSF-compliant pathogen barrier therein.

In another aspect, there is provided a luminaire structure which comprises a ceiling-mountable housing structure which defines an inner cartridge-receiving cavity accessible at an opening which is to be accessible in a healthcare space, and a luminaire cartridge structure to be sealingly received in the inner cartridge-receiving cavity. The ceiling-mountable housing structure and the luminaire cartridge structure are configured to establish a first NSF-compliant sealing barrier interface therebetween formed by at least one first barrier member extending along a first peripheral region between the ceiling-mountable housing structure and the luminaire cartridge structure to establish a first NSF-compliant pathogen barrier therein. The luminaire cartridge structure further comprises a light output region which is configured to locate an interior light guide and an exterior lens at a designated optical spacing therebetween. A second NSF-compliant sealing barrier interface is provided between the exterior lens and the interior light guide formed by at least one second barrier member extending along a second peripheral region between the exterior lens and the interior light guide, and which is configured to establish a second NSF-compliant pathogen barrier therein.

Some example embodiments may further comprise at least a pair of opposed web segments extending along respective boundaries of the light output region, wherein each of the web segments may provide opposed surfaces to locate the light guide and the exterior lens respectively.

In some example embodiments, the optical spacing may be governed or defined, at least in part, by a distance between the opposed surfaces and/or the at least one second barrier member.

In some example embodiments, each of the web segments may define at least one boundary region of a corresponding support structure that may define a cavity to receive a corresponding boundary region on the exterior lens.

In some example embodiments, the cavity may be bordered by a pair of opposed side boundary surfaces, and the at least one second barrier member may be configured to contact at least the side boundary surfaces and corresponding opposed surfaces on the exterior lens in the corresponding boundary region thereof.

In some example embodiments, the at least one second barrier member may include a barrier cavity to receive the exterior lens at the corresponding boundary region.

In some example embodiments, the at least one second barrier member may include a plurality of sealing formations to establish a plurality of contact points with at least the side boundary surfaces of the support structure.

Some example embodiments may further comprise a releasable locking structure for releasably locating the luminaire cartridge structure in the cartridge-receiving cavity.

In some example embodiments, the ceiling-mountable housing structure and/or the luminaire cartridge structure may include at least one recess extending along the first sealing barrier interface to receive the first barrier member.

In some example embodiments, the locking structure may be configured to release the luminaire cartridge structure from the cartridge receiving cavity on a withdrawal force on the luminaire cartridge structure.

In some example embodiments, the locking structure may include an opposed pair of biased latch segments configured to engage a corresponding opposed pair of locating tabs, each of both pairs may be provided with the cartridge structure or in the inner cartridge-receiving cavity.

Some example embodiments may further comprise at least one array of LED's extending along a peripheral region of the interior light guide or otherwise operatively optically coupled therewith.

Some example embodiments may further comprise a clamp structure to position the interior light guide in an operative position against the web segments.

In some example embodiments, each clamp structure may be configured to bias the interior light guide against the web segments.

In another aspect, there is provided a kit for assembling a ceiling-mountable luminaire structure in an NSF-compliant environment, comprising a ceiling-mountable housing structure with an accessible inner cavity including a first circumferential periphery, and a luminaire cartridge structure assembly including a second circumferential periphery and configured to be installed in the inner cavity to deliver lighting to the NSF-compliant environment. The ceiling-mountable housing structure and/or the luminaire cartridge structure assembly are configured to establish a first NSF-compliant sealing barrier interface between the first and second circumferential peripheries and to be engaged when the luminaire cartridge structure assembly is installed in the inner cavity, wherein the first NSF-compliant sealing interface is defined by opposed first and second planar surface regions extending along the respective first and second circumferential peripheries. The luminaire cartridge structure assembly is configured to locate an interior light guide and an exterior lens at a designated optical spacing therebetween to deliver the lighting to the NSF-compliant environment, with a second NSF-compliant sealing barrier interface between a third circumferential periphery associated with the light guide and a fourth circumferential periphery associated with the exterior lens. The interior light guide, the exterior lens and/or the designated optical spacing are independently configurable for at least one designated optical effect in one or more lighting delivery modes, so that, on installation of the ceiling-mountable housing structure and the luminaire cartridge structure assembly, the first and second NSF-compliant sealing barrier interfaces form an NSF-compliant barrier across the luminaire structure.

In some example embodiments, the first and second planar surface regions may be substantially parallel, in the first NSF-compliant sealing barrier interface.

In some example embodiments, the first, second, third and/or fourth circumferential peripheries may be substantially continuous.

Some example embodiments may further comprise one or more light emitting diode arrays or LED arrays, each to be optically coupled with the interior light guide therealong, at least in part, and configured to be responsive to an light emitting diode driver structure or LED driver structure to activate the array in one or more light delivery modes.

In some example embodiments, the light delivery modes may include a first mode in which a first group of one or more of the arrays may be activated to provide a first lighting effect, and a second mode in which a second group of one or more of the arrays may be activated to provide a second lighting effect.

Some example embodiments may further comprise at least a pair of opposed web segments extending along respective boundaries of the light output region, with opposed regions of the web segments defining the optical spacing between the light guide and the lens.

In some example embodiments, each of the web segments may provide opposed surfaces to locate the light guide and the lens respectively, and/or the optical spacing may be governed or defined, at least in part, by a distance between the opposed surfaces.

In some example embodiments, the second barrier member may include a barrier cavity to receive the lens at the corresponding boundary region, and a plurality of sealing formations to establish a plurality of contact points with at least the side boundary surfaces of the support structure.

In another aspect, there is provided a luminaire cartridge structure assembly as defined in any claim, aspect, example, embodiment or otherwise in the present disclosure.

In another aspect, there is provided a luminaire cartridge structure assembly for use in a ceiling-mountable housing structure with an accessible inner cavity including a first circumferential periphery with a first planar surface region extending therealong, to form a luminaire structure to deliver lighting to an NSF-compliant environment, the luminaire cartridge structure assembly comprising a second circumferential periphery with a second planar surface region extending therealong. The luminaire cartridge structure assembly is configured to be installed in the inner cavity to establish a first NSF-compliant sealing barrier interface between the first and second circumferential peripheries, wherein the first NSF-compliant sealing interface is defined by the first and second planar surface regions engaged therein. The luminaire cartridge structure assembly is configured to locate an interior light guide and an exterior lens at a designated optical spacing therebetween to deliver the lighting to the NSF-compliant environment, with a second NSF-compliant sealing barrier interface between a third circumferential periphery associated with the light guide and a fourth circumferential periphery associated with the exterior lens. The interior light guide, the exterior lens and/or the designated optical spacing are independently configurable for at least one designated optical effect in one or more lighting delivery modes, so that, on installation of the ceiling-mountable housing structure and the luminaire cartridge structure assembly, the first and second NSF-compliant sealing barrier interfaces form an NSF-compliant barrier across the luminaire structure.

In another aspect, there is provided a luminaire structure comprising an interior light guide and an exterior lens at a designated optical spacing therebetween, a group of LED arrays. Each array is directly or indirectly optically coupled with the interior light guide along at least part of a circumferential periphery thereof and configured to be responsive to an LED driver structure to activate the group of arrays in one or more light delivery modes to provide one or more distinct lighting effects.

In some example embodiments, the light delivery modes may include a first mode in which one of the arrays may be activated to provide a first lighting effect, and a second mode in more than one array may be activated to provide a second lighting effect.

In another aspect, there is provided a method of forming a kit for a luminaire structure in an NSF-compliant environment. The method may comprise:

providing a ceiling-mountable housing structure with an accessible inner cavity including a first circumferential periphery, and a luminaire cartridge structure assembly including a second circumferential periphery to be installed in the accessible inner cavity to deliver lighting to the NSF-compliant environment;

configuring the ceiling-mountable housing structure and/or the luminaire cartridge structure to establish a first NSF-compliant sealing barrier interface between the first and second circumferential peripheries to be engaged when the luminaire cartridge structure assembly is installed in the inner cavity, wherein the first NSF-compliant sealing interface is defined by engaged first and second planar surface regions extending along the respective first and second circumferential peripheries;

configuring the luminaire cartridge structure to locate an interior light guide and an exterior lens at a designated optical spacing therebetween to deliver the lighting to the NSF-compliant environment, with a second NSF-compliant sealing barrier interface between a third circumferential periphery on the light guide and a fourth circumferential periphery on the exterior lens;

configuring the interior light guide, the exterior lens and/or the spacing for at least one designated optical effect in one or more lighting delivery modes, so that, on installation of the luminaire cartridge structure in the inner cavity, the first and second NSF-compliant sealing barrier interfaces form an NSF-compliant barrier across the luminaire structure.

In some example embodiments, the first, second, third and/or fourth circumferential peripheries may be substantially continuous.

In some example embodiments, the opposed first and second planar surface regions may be substantially parallel in the first NSF-compliant sealing interface.

BRIEF DESCRIPTION OF THE FIGURES

Several example embodiments of the present disclosure will be provided, by way of examples only, with reference to the appended drawings, wherein:

FIG. 1a is a perspective view of a cartridge structure for use in the luminaire structure of FIG. 1;

FIG. 7 is a fragmentary perspective assembly view of the cartridge structure according to FIG. 1a.

DETAILED DESCRIPTION

Figure 1:
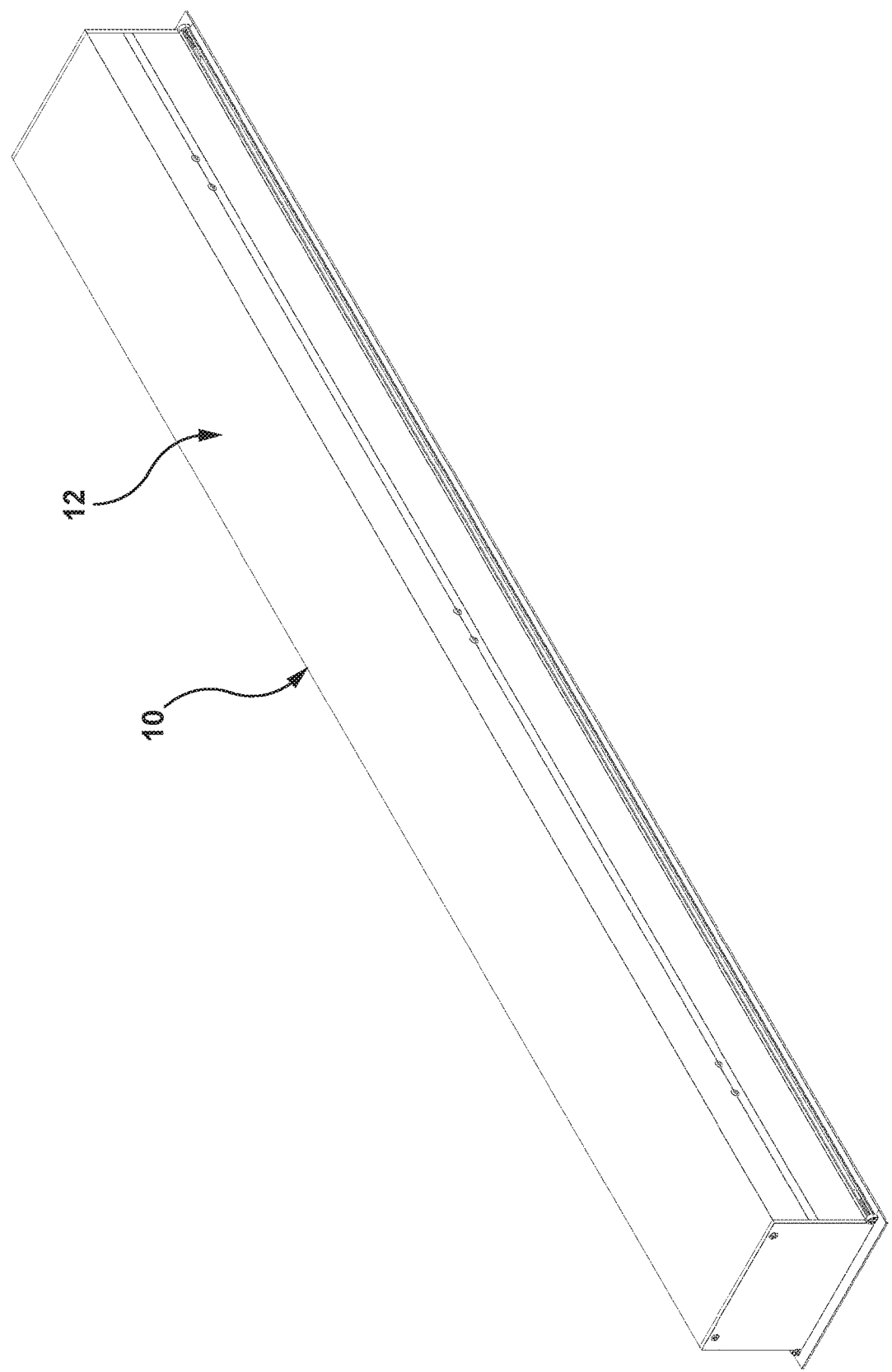
FIGS. 1 and 2 are top and bottom perspective views, respectively, of a luminaire structure.

It should be understood that the invention is not limited in its application to the details of construction and the arrangement of components set forth in the following description or illustrated in the drawings. The invention is capable of other example embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, vertical and horizontal are intended for operative context only and are not necessarily intended to limit the invention only to those configurations or orientations. Furthermore, and as described in subsequent paragraphs, the specific mechanical, electrical and/or other configurations illustrated in the drawings are intended to exemplify embodiments of the invention. However, other alternative mechanical, electrical and/or other configurations are possible which are considered to be within the teachings of the instant disclosure.

The term "LED" used herein may include, but not be limited to, semiconductor, electroluminescent, organic, polymeric or other material based light sources commonly known as generally as light emitting diodes, as well as polymeric and other such light sources, equivalents and variants thereof.

The term "NSF-compliant" environment used herein may include, but not be limited to, an interior controlled environment such as those in healthcare facilities, which must adhere to one or more standards established by the National Safety Foundation (NSF). For luminaires, the NSF dictates that such environments require low air pollutant cleanability, durability and structural integrity (https://www.nsf.org/services/by-industry/pharma-biotech/biosafety-cabinetry/light-fixture-certification). The protocol NSF P442 is a single certification that demonstrates that luminaires are constructed for use in controlled environments such as pharmaceutical processing, biotech research, biosafety laboratories, surgical suites, clean room manufacturing, food processing and horticulture. NSF P442: *Controlled Environment Light Fixtures* combines various test elements into one certification, demonstrating to customers and consulting engineers that P442 certified light fixtures meet the highest level of quality in the industry. The test elements include: i) testing required by the standard NSF/ANSI 2: *Food Equipment*, which establishes minimum sanitation requirements for materials, design and construction; ii) testing to demonstrate an International Protection (IP) rating of 65 or higher, showing that the light fixture provides a high level of protection against the intrusion of dust and water; and iii) unique pressure tests developed especially for NSF P442.

Figure 3:
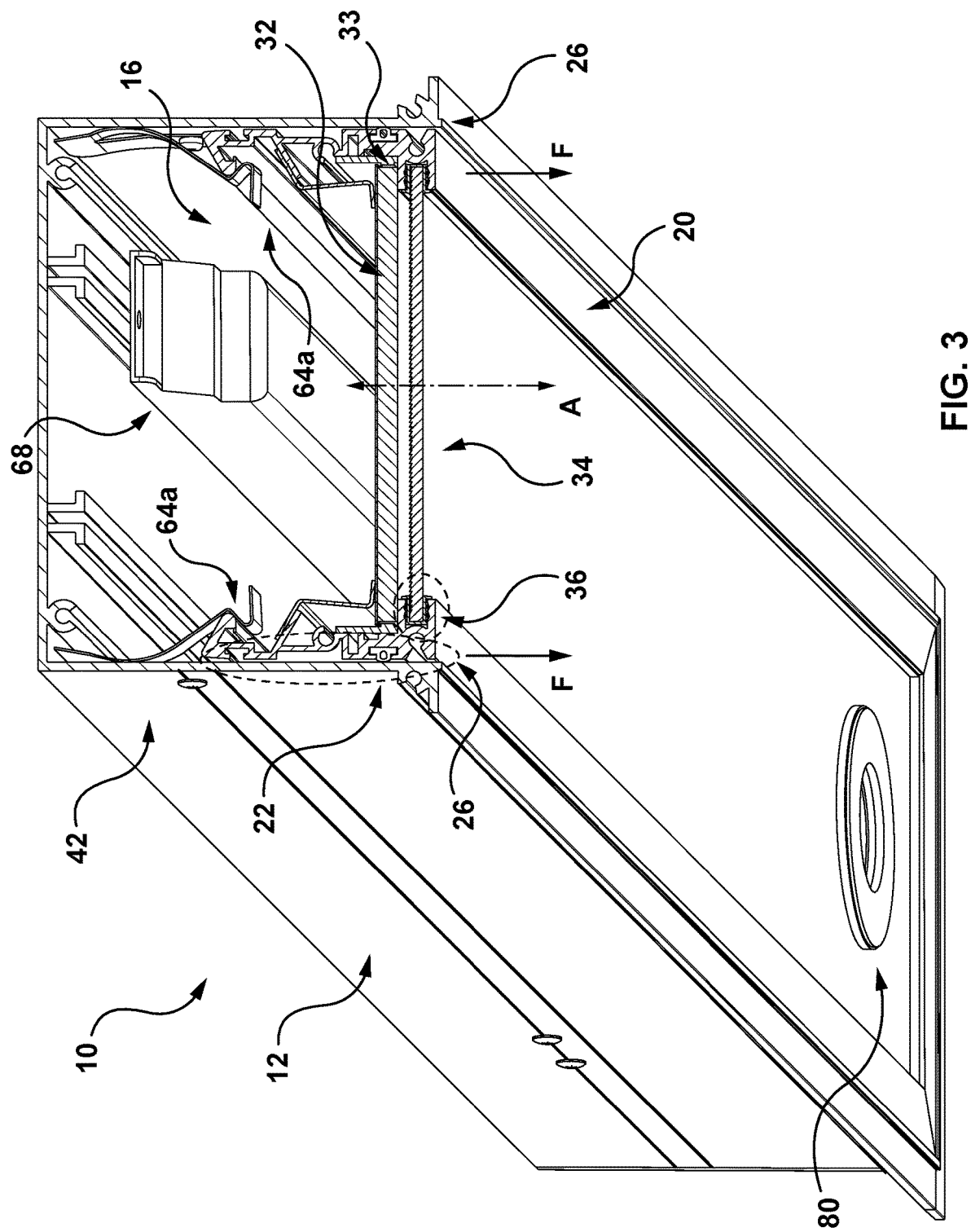
FIG. 3 is a sectional perspective view taken on line 3-3 of FIG. 2.
Figure 4:
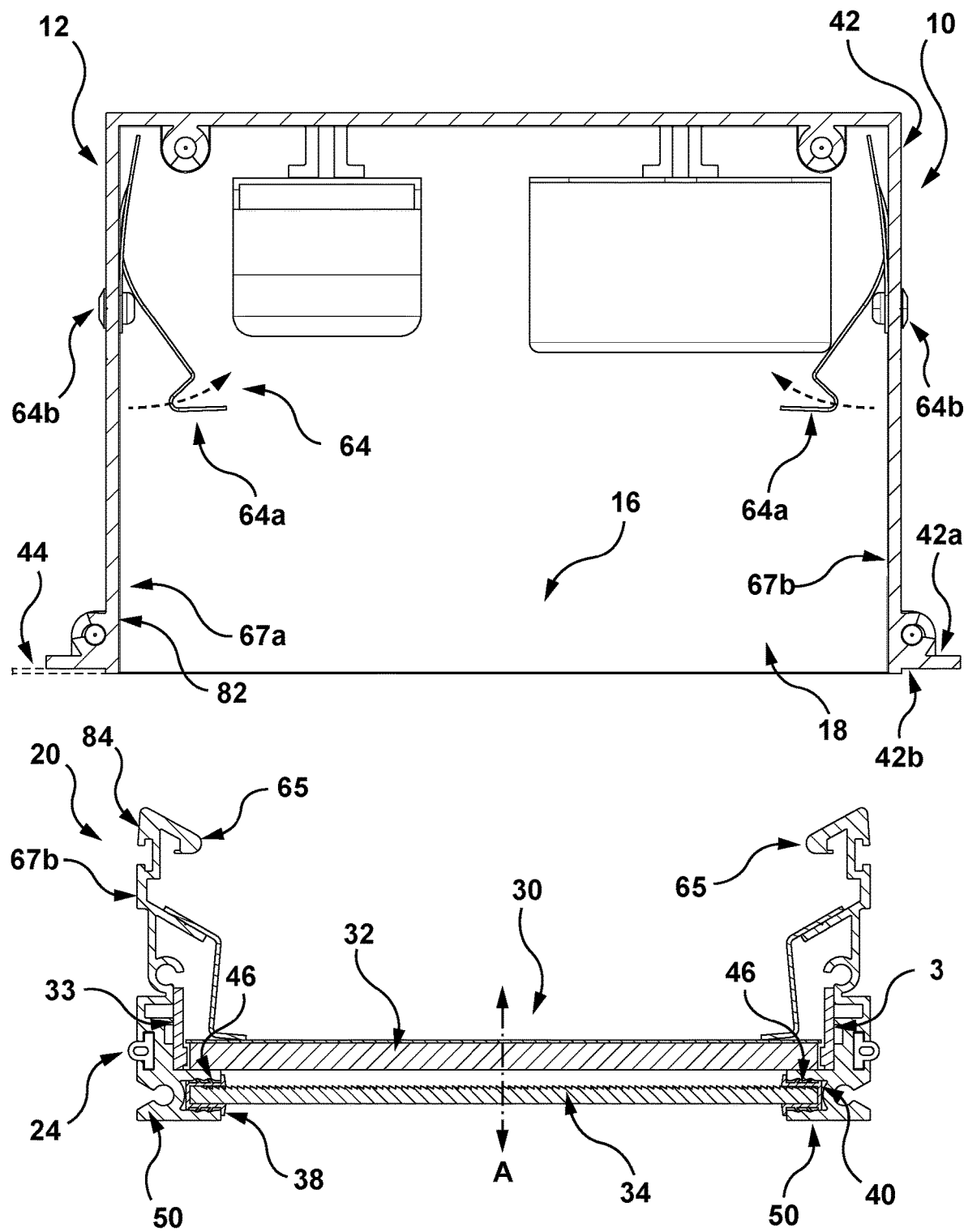
FIG. 4 is an enlarged exploded sectional view taken on line 3-3 of FIG. 2 with a cartridge structure removed from a housing structure.

Referring to the figures, there is provided a luminaire structure or luminaire 10 comprising a ceiling mountable housing structure or housing 12 which defines an inner cartridge-receiving cavity 16 (FIG. 4) accessible at an opening 18 which is to be accessible in a healthcare or other NSF-compliant space. Referring to FIGS. 1a, 3 and 4, a luminaire cartridge structure assembly or cartridge structure 20 is also provided to be sealingly received in the cavity 18, as can be seen in FIG. 3. As will be described, the housing structures 12 and cartridge structures 20 are configured to form a first NSF-compliant sealing barrier interface 22, which may be provided by at least one first barrier member 24 extending along a first peripheral region 26 (FIG. 3) extending along and between the housing structure 12 and the cartridge structure 20. The first barrier member 24 is configured to establish an NSF-compliant pathogen barrier in the first peripheral region 26.

Figure 5:
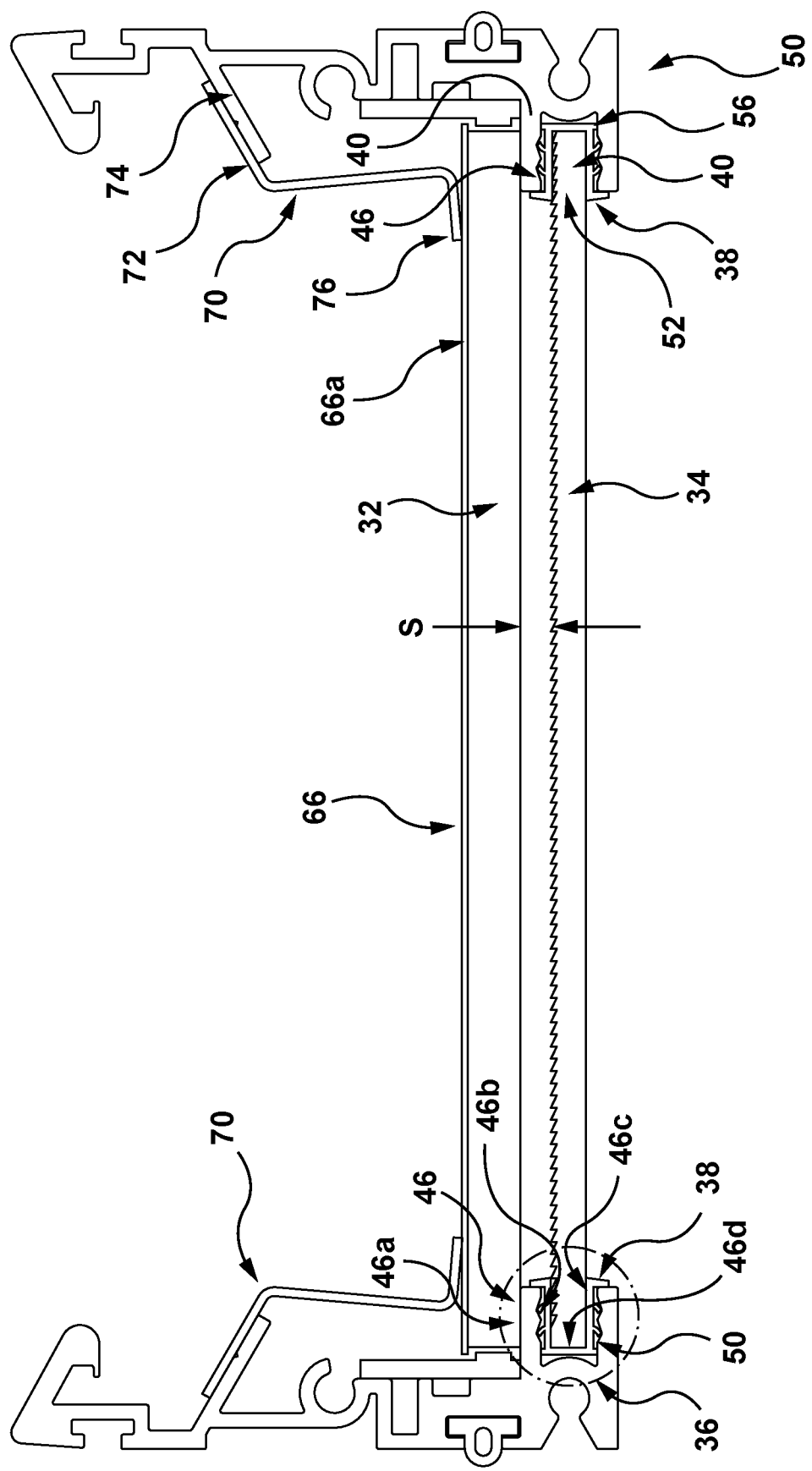
FIG. 5 is an enlarged sectional view of the cartridge structure according to FIG. 4.

Referring to FIG. 4, the cartridge structure 20 further comprises a light output region 30 which is configured to locate an interior light guide 32, which may be lit by one or more opposing arrays of LEDs 33, or other lighting elements, extending along at least one peripheral region, at least in part, of the light guide 32 or otherwise operatively optically coupled therewith. Referring to FIG. 5, an exterior lens 34 (or diffuser or other output element) is provided at a designated optical spacing "S" from the light guide 32, with a second NSF-compliant sealing barrier interface 36 between the lens 34 and the light guide 32. The second NSF-compliant sealing barrier interface 36 may be provided by least one second barrier member 38 extending along opposed second peripheral regions 40 between the lens 32 and light guide 34, and is configured to establish an NSF-compliant pathogen barrier therein. A number of configurations may be used to form the first and/or second barrier members 24, 38 including a number of barrier segments in the form of layers, films or other formations using of a range of polymers butadiene rubber, or other such sealant materials as will be known to those of skill in the art.

In some example embodiments, the second sealing barrier interface 36 may be provided between a third continuous circumferential periphery on the light guide and a fourth continuous circumferential periphery on the exterior lens. This may be provided, in some example embodiments by continuous barrier members, or discontinuous barrier members, which are nonetheless arranged in ways that provide the required NSF-compliant barrier.

The designated optical spacing S is configured to enable the light guide 32 to establish a light guide—air interface to form the relative internal angles of refraction and reflection, as part of a functional configuration of the light guide 32, according to its designated photometrics.

In some example embodiments, the housing structure 12 and/or the cartridge structure 20 may include one or more extruded segments. Referring to FIG. 4, in the case of the housing structure 12, it may include a shell structure or shell 42 formed from one or more such extruded segments. The shell structure 42 may be provided with opposed support segments 42a with a shallow step formed at 42b to seat a ceiling grid element 44 as shown on the left hand support segment in FIG. 4, wherein the depth of the step may conform to the thickness of the ceiling grid element or is otherwise configured to substantially prevent threads from cleaning cloths and the like to be entrapped, for instance.

Referring to FIGS. 4 and 5, one or more opposed web segments shown at 46 may extend along respective sections of the light output region 30, with opposed regions of the web segments defining the spacing "S", at least in part, between the light guide 32 and the lens 34. In the example embodiment of FIG. 5, the web segments 46 may each provide opposed surfaces 46a, 46b to locate the light guide 32 and the lens 34, respectively. The spacing S may, in this case, be governed or defied, at least in part, by the distance between the opposed surfaces 46a, 46b and the thickness of the second barrier members 38.

Figure 6:
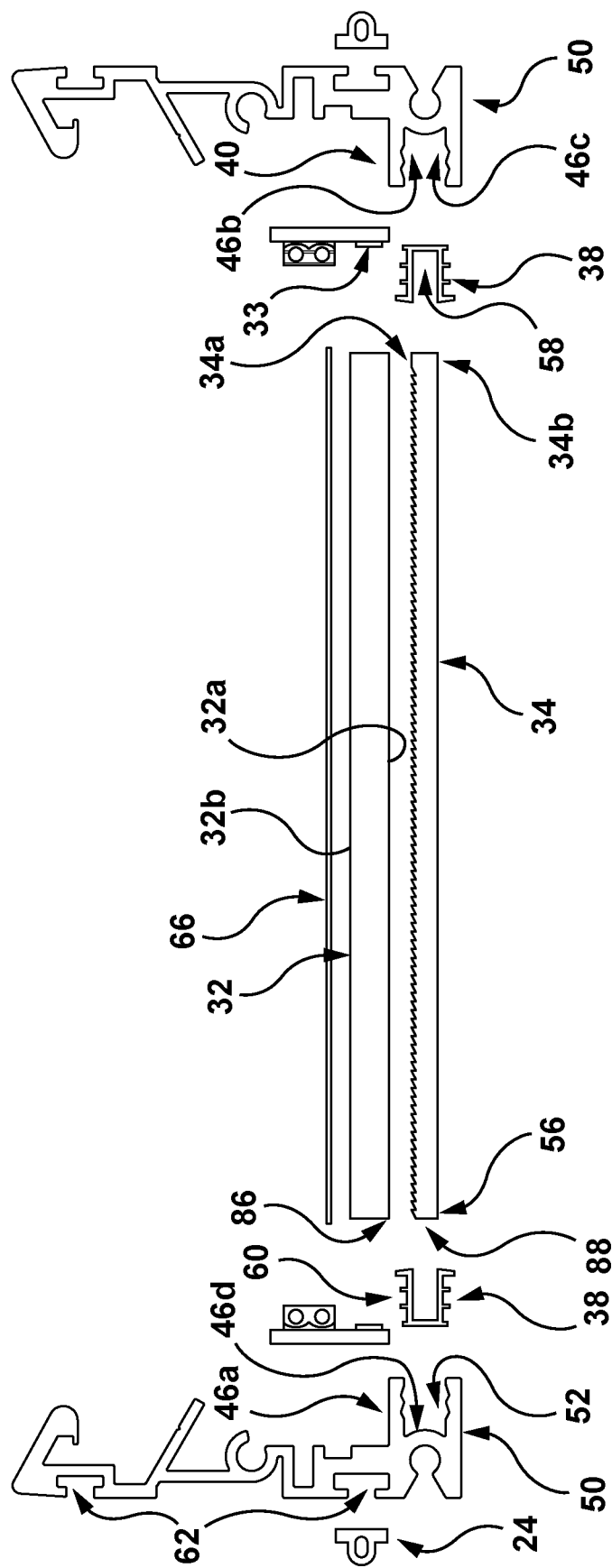
FIG. 6 is an exploded assembly view of the cartridge structure according to FIG. 5.
Figure 7:
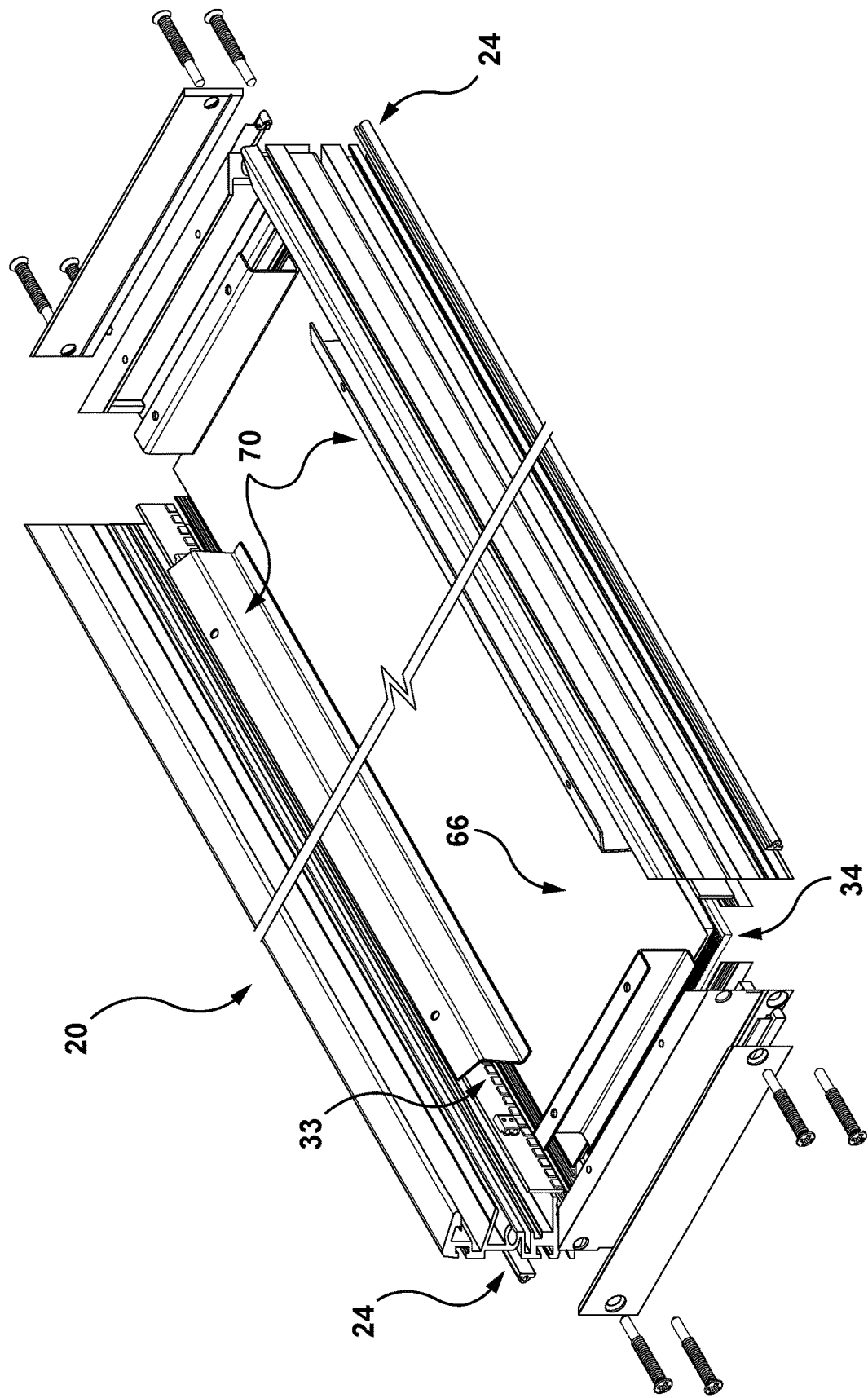

In some example embodiments as shown in FIGS. 5 and 6, each of the web segments 46 may be defined on at least one boundary of a support structure or support 50 in which each of the web segments provides a cavity 52 to receive a corresponding boundary region 56 on the lens 34.

The cavity 52 is bordered by a pair of opposed side boundary surfaces including surface 46b and opposing surface 46c, and a back boundary surface 46d. In this case, the second barrier member 38 may be configured to contact at least the side boundary surfaces 46b, 46c and corresponding opposed surfaces 34a, 34b (FIG. 6) on the lens 34 at a corresponding boundary region 56 thereof.

In some example embodiments as shown in FIG. 6, the second barrier member 38 may include a barrier cavity 58 to receive lens 34 at the corresponding boundary region 56. The second barrier member 38 may also include a plurality of sealing formations, such as tabs 60, to establish a plurality of contact points with at least the side boundary surfaces 46b, 46c of the support structure 50.

In some example embodiments, the housing structure 12 and/or the cartridge structure 20, as shown in FIG. 6, may include one or more recesses or other formations extending along the first sealing barrier interface, such as in this example, the recesses 62 in the cartridge structure, to receive the one or more first barrier members 24.

Referring to FIG. 4, also provided is one or more locking structures or locks 64, for example distributed along the span of the housing structure 12, for releasably locating the cartridge structure 20 in the cartridge-receiving cavity 16. The locking structure 64 may include an opposed pair of spring-loaded latches 64a held by fasteners 64b, with each latch configurable to engage a corresponding one of a pair of opposed pair of locating tabs 65 on the opposed support structures 50. Alternatively, among other configurations, the pairs of locking latches 64a and locating tabs 65 may instead be provided on the cartridge structure 20 and cartridge receiving cavity 16 respectively. Each latch 64a and corresponding locating tab 65 may be configured to enable the latch 64a to slide over the locating tab 65 and establish a located position as shown in FIG. 3, which may be released with an appropriate releasing force F exerted on the cartridge structure 20.

In some example embodiments, as shown in FIG. 4, the first NSF-compliant sealing interface may thus be defined at opposed substantially parallel first and second planar surface regions 67a, 67b extending along the respective first and second continuous circumferential peripheries of the housing structure 12 and the cartridge structure 20. The first and second planar surface regions 67a, 67b may thus enable the cartridge structure 20 to be withdrawn unidirectionally along travel axis A.

Thus, in some example embodiments, as shown in FIG. 3, the first and second sealing barrier interfaces 22 and 36 may be configured to establish an NSF-compliant pathogen barrier, with the first sealing barrier interface 22 being established between the cartridge structure 20 and the housing structure 12 at a first peripheral region 26 between them, while the second sealing barrier interface 36 may be established between the outer lens 34 and the support structures 50 forming the cartridge structure 20. In this case, the light guide 32, the LED arrays 33 and associated components such as a driver shown at 68 (in FIG. 3) and wiring harness(es) (not shown) joining it to the LED arrays 33 may both be behind the first and second sealing barrier interfaces 23 and 36, while maintaining the optical spacing S (FIG. 5) to provide the light guide 32 with an light guide-air boundary therewith to perform optically with the required refraction angles on either side of the light-guide air boundary.

In some example embodiments, as viewed in FIGS. 5 and 6, the light guide has a surface 32a which faces the lens 34 and a surface 32b and faces a reflector plate 66. A clamping structure or clamp 70, may be provided to position the reflector plate 66 and light guide 32 in an operative position against the web segments 46. In this case, each clamp structure 70 may be configured as a resilient flange to be anchored at an upper end region 72 as viewed in FIG. 5 which may be fastened to an anchor web 74, and a free end region 76 to contact an upper surface 66a on the reflector plate and apply biasing force thereto and thus against the web segments 46.

Figure 8A:
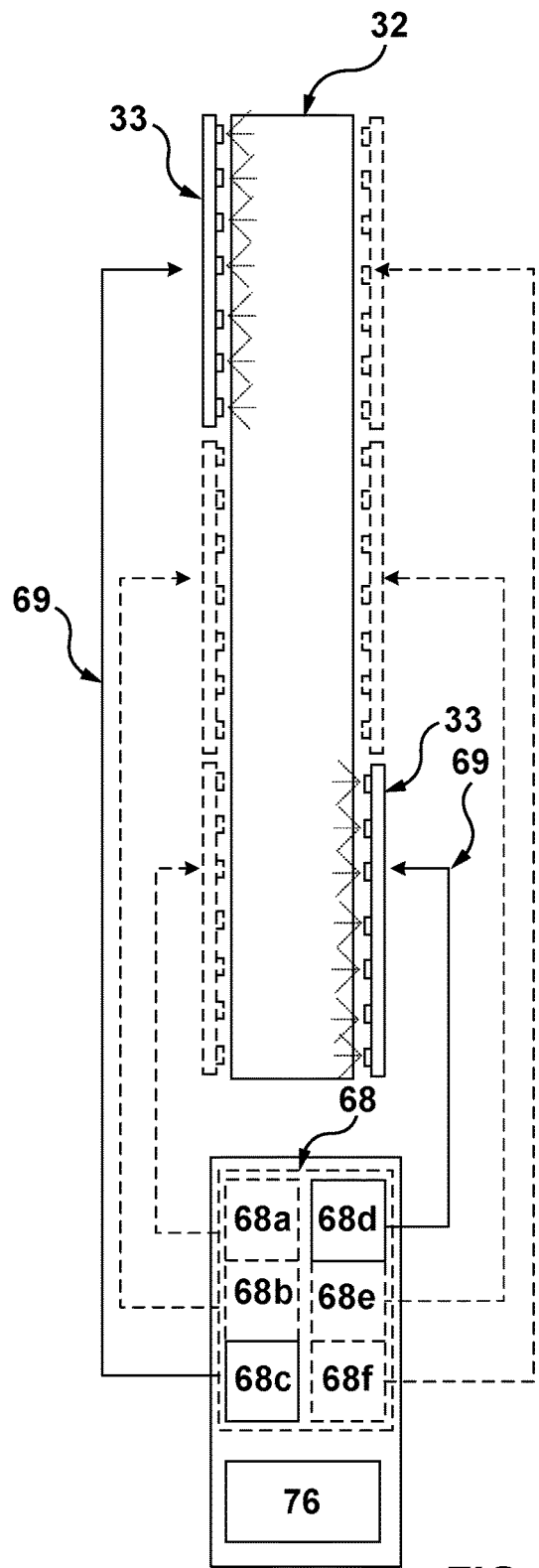
FIGS. 8a and 8b are schematic plan views showing operative modes of LED arrays and an associated light guide of the cartridge structure of FIG. 7.
Figure 8B:
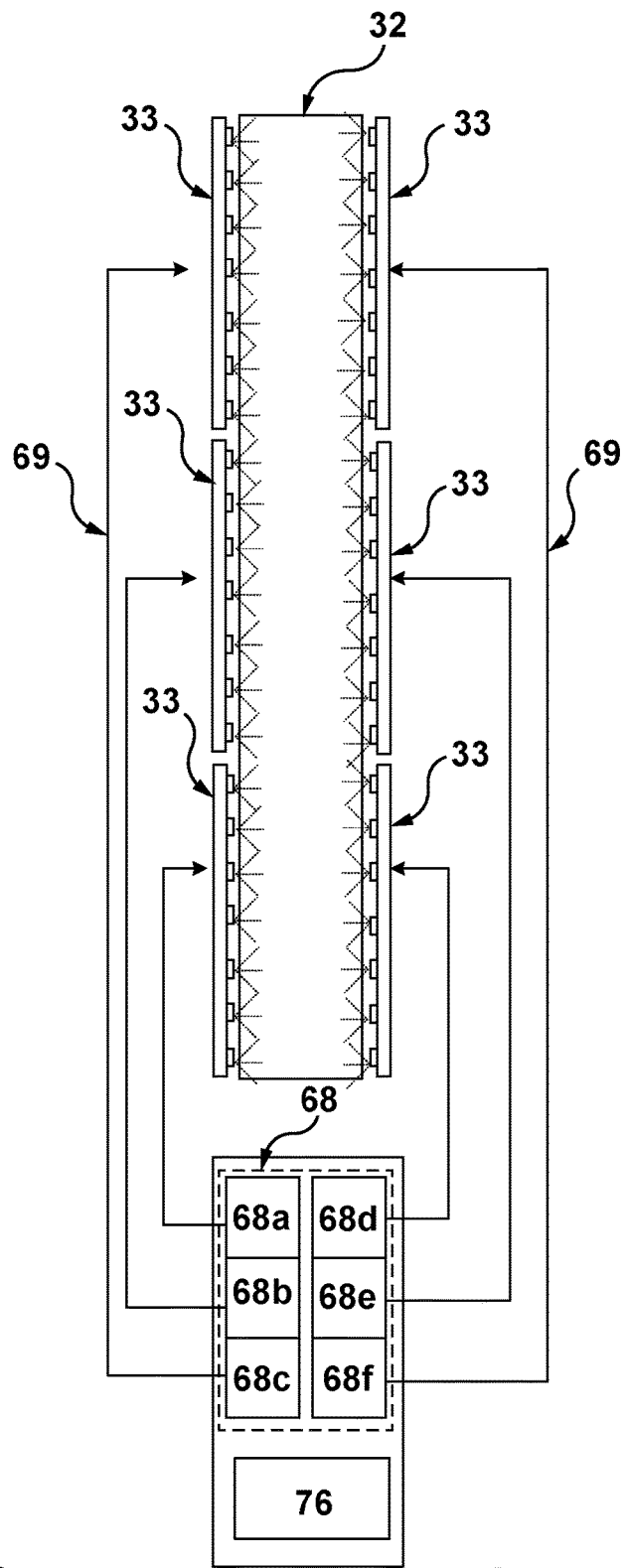

Referring to FIGS. 8a and 8b, the LED arrays 33 may be further configured as a plurality of aligned or non-aligned LED arrays 33, or groups of aligned or non-aligned LEDs, in which each array may be optically coupled with the interior light guide 32 along at least part of a peripheral region thereof and responsive to a driver 68 or a plurality thereof, as shown at 68a to 68f, on instructions from at least one processor shown at 76, to activate each array 33 via conductive paths 69, in one or more light delivery modes to provide one or more distinct lighting effects. FIG. 8a schematically illustrates a distinct light effect in which two arrays 33 on opposite longitudinal boundaries of the light guide 32 and at opposite end regions thereof are activated, while FIG. 8b schematically illustrates a different distinct light effect in which all three arrays 33 on both longitudinal boundaries of the light guide 32 and activated. While not shown in FIGS. 8a and 8b, LED arrays may also be provided along the opposed end regions. This may provide for a wide range of possible and distinct lighting effects that may be applicable in both NSF-compliant environments as well as others.

Figure 2:
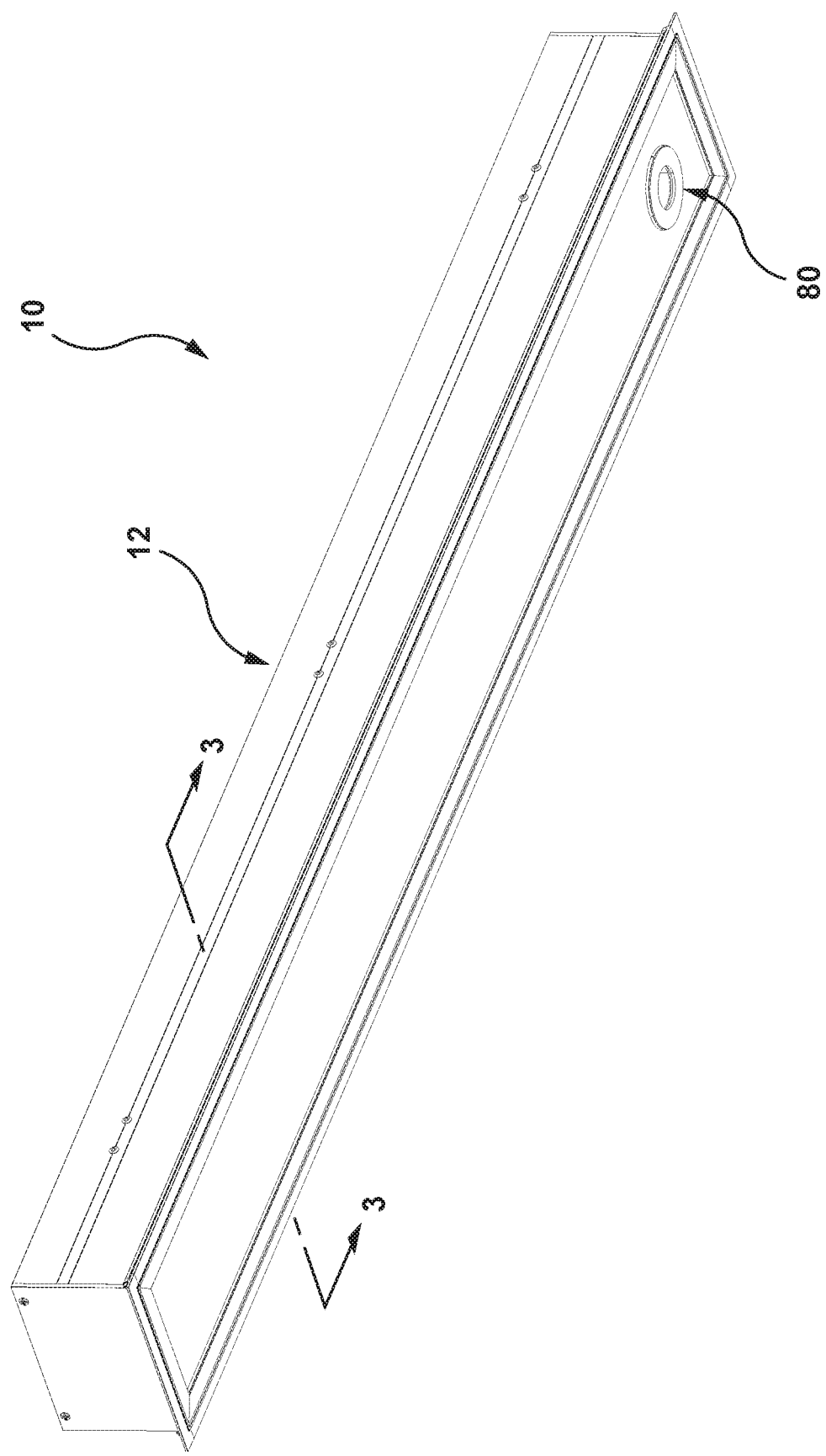

In some example embodiments, as shown in FIGS. 2 and 3, other useful lighting effects may be added to the luminaire structure 10, such as one or more localized light sources at one or more locations such as an opening 80, such as disclosed in U.S. patent application Ser. No. 16/899,047, filed Jun. 11, 2020, entitled LUMINAIRE STRUCTURE.

With reference to FIGS. 3 and 4, some example embodiments may be provided in the form of a kit for assembling a ceiling or other mountable luminaire structure, such as that shown at 10, in an NSF-compliant environment, which may comprise a ceiling or other mountable housing structure 12 with an accessible inner cavity 16 defined by a first circumferential periphery 82, such as one which is substantially continuous, along with a luminaire cartridge structure assembly 20 defined by a second circumferential periphery 84, such as one which is substantially continuous, to be installed in the cavity to deliver lighting to the NSF-compliant environment.

The housing structure 12 and/or the cartridge structure assembly 20 may thus configured to establish a first NSF-compliant sealing barrier interface 22 therebetween and to be engaged when the cartridge structure assembly 20 is installed in the cavity 16, wherein the first NSF-compliant sealing interface 22 is defined by opposed substantially parallel first and second planar surface regions 67a, 67b extending along the respective first and second continuous circumferential peripheries 82, 84.

The cartridge structure assembly 20 may be configured to locate an interior light guide 32 and an exterior lens 34 at a designated optical spacing therebetween to deliver the lighting to the NSF-compliant environment, with a second NSF-compliant sealing barrier interface 36 between a third circumferential periphery 86, such as one which is substantially continuous, on the light guide 32 and a fourth circumferential periphery 88 (FIG. 6), such as one which is substantially continuous, on the exterior lens 34.

The interior light guide 32, the exterior lens 34 and/or the spacing S may be independently configurable for at least one designated optical effect in one or more lighting delivery modes, so that, on installation of the housing structure 12 and the cartridge structure assembly 20, the first and second NSF-compliant sealing barrier interfaces 22, 36 may form a substantially complete or substantially continuous NSF-compliant barrier across the luminaire structure.

Some example embodiments may further provide a group of aligned LED arrays 33, wherein each array 33 may be optically coupled with the interior light guide 32 along at least part of the third continuous circumferential periphery 86 thereof and a responsive to an LED driver structure or driver 68 to activate the arrays 33 in one or more light delivery modes. Such the light delivery modes may include a first mode in which one of the arrays 33 is activated to provide a first lighting effect, and a second mode in more than one of the arrays 33 is activated to provide a second lighting effect.

In some examples, the housing structures 12 may be common for a number of luminaire structures 10 in a particular application or location, while the luminaire cartridge structure assembly 20 may be configurable so as to meet different lighting criteria in the application or location.

Thus, example embodiments may provide configurable luminaire structures 10 which may be NSF-compliant, as well as to provide a plurality of distinct lighting effects to suit the needs of a number of different users, as may arise in such NSF-compliant environments and others. In such examples, the cartridge structure assemblies 20 may be assembled by selecting one of a number of possible interior light guides 32 and one of a number of exterior lenses 34, to deliver a particular optical effect appropriately suited to the application. Each cartridge structure assembly 20 may then be provided separately or together with a matching housing structure 12 for later installation.

Some example embodiments may provide a method for forming a kit for a luminaire structure 10 which may be configured to be NSF-compliant and thus to be installed in an NSF-compliant environment. The method may include providing a ceiling-mountable housing structure 12 with an accessible inner cavity 16 defined by a first circumferential periphery 82 (FIG. 4), and a luminaire cartridge structure assembly 20 defined by a second circumferential periphery 84 to be installed in the cavity 16 to deliver lighting to the NSF-compliant environment.

The method may include configuring the housing structure 12 and/or the cartridge structure assembly 20 to establish a first NSF-compliant sealing barrier interface 22 therebetween to be engaged when the cartridge structure assembly 20 is installed in the cavity 16, wherein the first NSF-compliant sealing interface 22 may be defined by opposed substantially parallel first and second planar surface regions 67a, 67b extending along the respective first and second circumferential peripheries 82, 84.

Referring to FIGS. 5 and 6, the method may include configuring the cartridge structure assembly 20 to locate an interior light guide 32 and an exterior lens 34 at a designated optical spacing S therebetween to deliver the lighting to the NSF-compliant environment, with a second NSF-compliant sealing barrier interface 36 between a third circumferential periphery 86 on the light guide and a fourth circumferential periphery 88 on the exterior lens 34.

The method may include configuring the interior light guide 32, the exterior lens 34 and/or the spacing S for at least one designated optical effect in one or more lighting delivery modes, so that, on installation of the housing structure 12 and the cartridge structure assembly 20, the first and second NSF-compliant sealing barrier interfaces 22, 36 to form a substantially complete or substantially continuous NSF-compliant barrier across the luminaire structure 10.

Referring to FIG. 4, some example embodiments of a luminaire structure such as shown at 10 may be installed in an NSF-compliant environment by first providing a ceiling-mountable housing structure 12 with an accessible inner cavity 16 defined by a first circumferential periphery 82, and a luminaire cartridge structure assembly 20 defined by a second circumferential periphery 84 to be installed in the cavity 16 to deliver lighting to the NSF-compliant environment. The housing structure 12 and/or the cartridge structure assembly 20 may be configured to establish a first NSF-compliant sealing barrier interface 22 therebetween to be engaged when the cartridge structure assembly 20 is installed in the cavity 16. The first NSF-compliant sealing interface 22 may be defined by opposed substantially parallel first and second planar surface regions 67a, 67b extending along the respective first and second circumferential peripheries 82, 84. The luminaire cartridge structure assembly 20 may be configured to locate an interior light guide 32 and an exterior lens 34 at a designated optical spacing S therebetween to deliver the lighting to the NSF-compliant environment, with a second NSF-compliant sealing barrier interface 36 between a third circumferential periphery 86 on the interior light guide 32 and a fourth circumferential periphery 88 on the exterior lens 34. The interior light guide 32, the exterior lens 34 and/or spacing S may be configured for at least one designated optical effect in one or more lighting delivery modes, so that, on installation of the housing structure 12, and the cartridge structure assembly 20, the first and second NSF-compliant sealing barrier interfaces 22, 36 may form a substantially complete or substantially continuous NSF-compliant barrier across the luminaire structure 10.

While the present disclosure describes various example embodiments, the disclosure is not so limited. To the contrary, the disclosure is intended to cover various modifications and equivalent arrangements, as will be readily appreciated by the person of ordinary skill in the art.

The invention claimed is:

1. A luminaire structure comprising a ceiling-mountable housing structure which defines an inner cartridge-receiving cavity accessible at an opening which is to be accessible in a healthcare space, and a luminaire cartridge structure to be sealingly received in the inner cartridge-receiving cavity, the ceiling-mountable housing structure and the luminaire cartridge structure being configured to establish a first NSF-compliant sealing barrier interface therebetween formed by at least one first barrier member extending along a first peripheral region between the ceiling-mountable housing structure and the luminaire cartridge structure to establish a first NSF-compliant pathogen barrier therein, the luminaire cartridge structure further comprising a light output region which is configured to locate an interior light guide and an exterior lens at a designated optical spacing therebetween, and a second NSF-compliant sealing barrier interface between the exterior lens and the interior light guide formed by at least one second barrier member extending along a second peripheral region between the exterior lens and the interior light guide, and which is configured to establish a second NSF-compliant pathogen barrier therein.

2. The luminaire structure as defined in claim 1, further comprising at least a pair of opposed web segments extending along respective boundaries of the light output region, wherein each of the web segments provides opposed surfaces to locate the light guide and the exterior lens respectively.

3. The luminaire structure as defined in claim 2, wherein the optical spacing is governed, at least in part, by a distance between the opposed surfaces and/or the at least one second barrier member.

4. The luminaire structure as defined in claim 2, wherein each of the web segments defines at least one boundary region of a corresponding support structure that defines a cavity to receive a corresponding boundary region on the exterior lens.

5. The luminaire structure as defined in claim 4, wherein the cavity is bordered by a pair of opposed side boundary surfaces, and the at least one second barrier member is configured to contact at least the side boundary surfaces and corresponding opposed surfaces on the exterior lens in the corresponding boundary region thereof.

6. The luminaire structure as defined in claim 5, wherein the at least one second barrier member includes a barrier cavity to receive the exterior lens at the corresponding boundary region.

7. The luminaire structure as defined in claim 6, wherein the at least one second barrier member includes a plurality of sealing formations to establish a plurality of contact points with at least the side boundary surfaces of the support structure.

8. The luminaire structure as defined in claim 1, further comprising a releasable locking structure for releasably locating the luminaire cartridge structure in the cartridge-receiving cavity.

9. The luminaire structure as defined in claim 1, wherein the ceiling-mountable housing structure and/or the luminaire cartridge structure includes at least one recess extending along the first sealing barrier interface to receive the first barrier member.

10. The luminaire structure as defined in claim 8, wherein the locking structure is configured to release the luminaire cartridge structure from the cartridge receiving cavity on a withdrawal force on the luminaire cartridge structure.

11. The luminaire structure as defined in claim 10, wherein the locking structure includes an opposed pair of biased latch segments configured to engage a corresponding opposed pair of locating tabs, each of both pairs being provided with the cartridge structure or in the inner cartridge-receiving cavity.

12. The luminaire structure as defined in claim 1, further comprising at least one array of LED's extending along a peripheral region of the interior light guide or otherwise operatively optically coupled therewith.

13. The luminaire structure as defined in claim 2, further comprising a clamp structure to position the interior light guide in an operative position against the web segments.

14. The luminaire structure as defined in claim 13, wherein each clamp structure is configured to bias the interior light guide against the web segments.

15. A kit for assembling a ceiling-mountable luminaire structure in an NSF-compliant environment, comprising:
  a ceiling-mountable housing structure with an accessible inner cavity including a first circumferential periphery, and a luminaire cartridge structure assembly including a second circumferential periphery and configured to be installed in the inner cavity to deliver lighting to the NSF-compliant environment;
  the ceiling-mountable housing structure and/or the luminaire cartridge structure assembly being configured to establish a first NSF-compliant sealing barrier interface between the first and second circumferential peripheries and to be engaged when the luminaire cartridge structure assembly is installed in the inner cavity, wherein the first NSF-compliant sealing interface is defined by opposed first and second planar surface regions extending along the respective first and second circumferential peripheries;
  the luminaire cartridge structure assembly being configured to locate an interior light guide and an exterior lens at a designated optical spacing therebetween to deliver the lighting to the NSF-compliant environment, with a second NSF-compliant sealing barrier interface between a third circumferential periphery associated with the light guide and a fourth circumferential periphery associated with the exterior lens;
  wherein the interior light guide, the exterior lens and/or the designated optical spacing are independently configurable for at least one designated optical effect in one or more lighting delivery modes, so that, on installation of the ceiling-mountable housing structure and the luminaire cartridge structure assembly, the first and second NSF-compliant sealing barrier interfaces form an NSF-compliant barrier across the luminaire structure.

16. The kit as defined in claim 15, wherein the first and second planar surface regions are substantially parallel, in the first NSF-compliant sealing barrier interface.

17. The kit as defined in claim 15, wherein the first, second, third and/or fourth circumferential peripheries are substantially continuous.

18. The kit as defined in claim 15, further comprising one or more LED arrays, each to be optically coupled with the interior light guide therealong, at least in part, and configured to be responsive to an LED driver structure to activate the array in one or more light delivery modes.

19. The kit as defined in claim 18, wherein the light delivery modes includes a first mode in which a first group of one or more of the arrays is activated to provide a first lighting effect, and a second mode in which a second group of one or more of the arrays is activated to provide a second lighting effect.

20. The luminaire cartridge structure assembly as defined in claim 15.

\* \* \* \* \*